(12) United States Patent
Numnual et al.

(10) Patent No.: US 7,955,009 B2
(45) Date of Patent: Jun. 7, 2011

(54) SECTOR BLADE DRIVING APPARATUS

(75) Inventors: Phichet Numnual, Pathumthani (TH); Takashi Nakano, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 22 days.

(21) Appl. No.: 12/616,360

(22) Filed: Nov. 11, 2009

(65) Prior Publication Data

US 2010/0054729 A1 Mar. 4, 2010

Related U.S. Application Data

(63) Continuation of application No. PCT/JP2009/052473, filed on Feb. 16, 2009.

(30) Foreign Application Priority Data

Mar. 19, 2008 (JP) ................................. 2008-072290

(51) Int. Cl.
*G03B 9/10* (2006.01)
(52) U.S. Cl. ....................................................... 396/493
(58) Field of Classification Search .................. 396/493, 396/491, 489, 488, 486, 483
See application file for complete search history.

(56) References Cited

U.S. PATENT DOCUMENTS

| | | | |
|---|---|---|---|
| 7,316,514 B2* | 1/2008 | Naganuma | 396/450 |
| 7,568,849 B2* | 8/2009 | Hayakawa et al. | 396/505 |
| 7,573,629 B2* | 8/2009 | Bai | 359/230 |
| 2006/0039695 A1* | 2/2006 | Naganuma | 396/485 |
| 2006/0245752 A1* | 11/2006 | Kawaguchi | 396/451 |

FOREIGN PATENT DOCUMENTS

| | | |
|---|---|---|
| JP | 2002-162665 A1 | 6/2002 |
| JP | 2003-185989 A1 | 7/2003 |
| JP | 2005-164842 A1 | 6/2005 |
| JP | 2006-84895 A1 | 3/2006 |
| JP | 2006-98515 A1 | 4/2006 |
| JP | 2006-178366 A1 | 7/2006 |

OTHER PUBLICATIONS

International Search Report for International Application No. PCT/JP2009/052473 dated Mar. 17, 2009.

* cited by examiner

*Primary Examiner* — W. B. Perkey
*Assistant Examiner* — Linda B Smith
(74) *Attorney, Agent, or Firm* — Kratz, Quintos & Hanson, LLP

(57) ABSTRACT

A sector blade driving apparatus includes: a board having an opening; a blade supported for linear movement, adjusting an opening amount of the opening, and having first and second engagement holes; a drive member rotating to drive the blade; and an arm transmitting an drive force of the drive member to the blade, and provided in the drive member. The arm is provided with first and second drive pins respectively engaging the first and second engagement holes.

5 Claims, 11 Drawing Sheets

US 7,955,009 B2

SECTOR BLADE DRIVING APPARATUS

CROSS-REFERENCE TO RELATED APPLICATION

This application is a continuation of and claims priority to International Patent Application No. PCT/JP2009/052473 filed on Feb. 16, 2009, which claims priority to Japanese Patent Application No. 2008-072290 filed on Mar. 19, 2008, subject matter of these patent documents is incorporated by reference herein in its entirety.

BACKGROUND OF THE INVENTION

1. Field of the Invention

The present invention relates to sector blade driving apparatuses.

2. Description of the Related Art

Conventionally, there is known a sector blade driving apparatus employed in a camera or the like. Patent Document 1 (Japanese Unexamined Patent Application Publication No. 2006-84895) discloses a sector driving apparatus having: a first arm attached to a rotary shaft; a second arm swingably supported by a shaft projecting from a base plate, and having a first oblong hole engaging a first operation pin provided in the first arm; a blade (sector) having a second oblong hole engaging a second operation pin provided in the second arm.

In light of the apparatus disclosed in Patent Document 1, the two arms are necessary. This increases the number of the parts and complicates the apparatus.

Conceivably, the moving distance of the drive pin is ensured by simply elongating a distance from the rotation center of the arm to the drive pin, thereby ensuring the moving distance of the blade. However, if the distance from the rotation center of the arm to the drive pin is elongated, the arm will be elongated, so it is necessary to provide a large space, which permits the arm to rotate within the sector blade driving apparatus. The provision of such a space increases the size of the sector blade driving apparatus.

SUMMARY OF THE INVENTION

It is therefore an object of the present invention to provide a sector blade driving apparatus which simplifies its structure, reduces its size, and ensures a moving distance of a blade.

According to an aspect of the present invention, there is provided a sector blade driving apparatus including: a board having an opening; a blade supported for linear movement, adjusting an opening amount of the opening, and having first and second engagement holes; a drive member rotating to drive the blade; and an arm transmitting a drive force of the drive member to the blade, and provided in the drive member, wherein the arm is provided with first and second drive pins respectively engaging the first and second engagement holes.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of a sector blade driving apparatus according to the present invention.

First Embodiment

Figure 1:
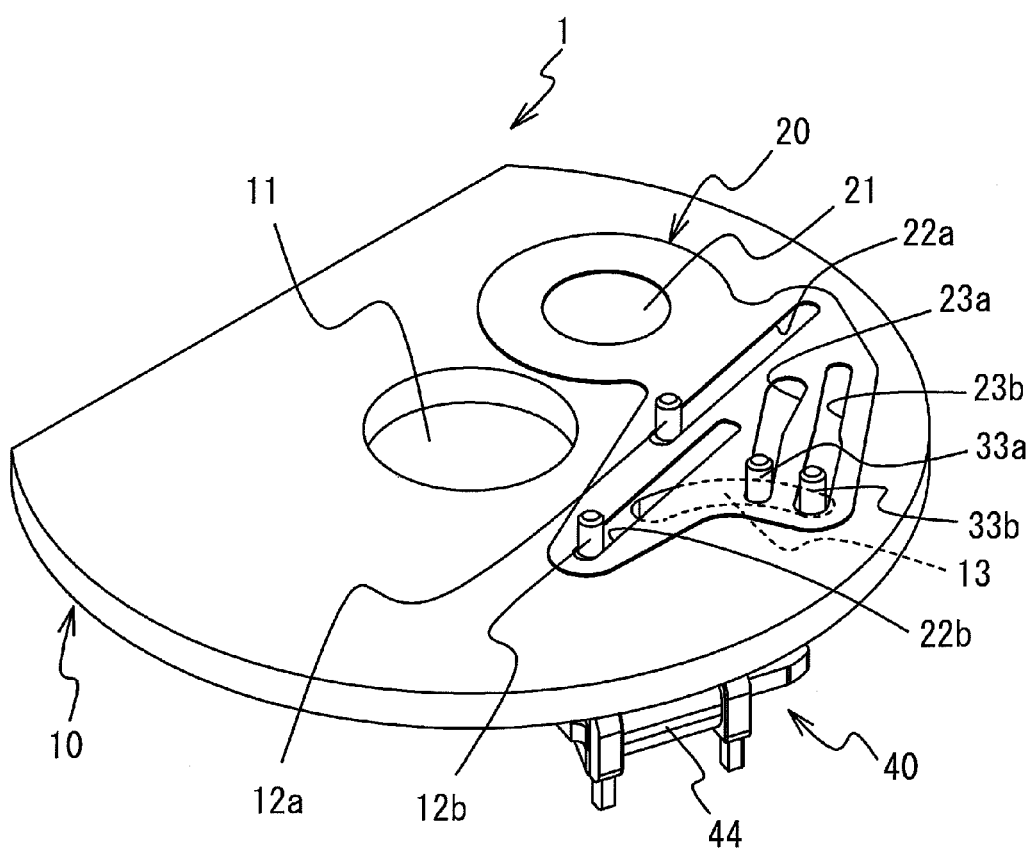
FIG. 1 is a perspective view of a sector blade driving apparatus according to an embodiment.

FIG. 1 is a perspective view of a sector blade driving apparatus 1 according to a first embodiment.

Figure 2:
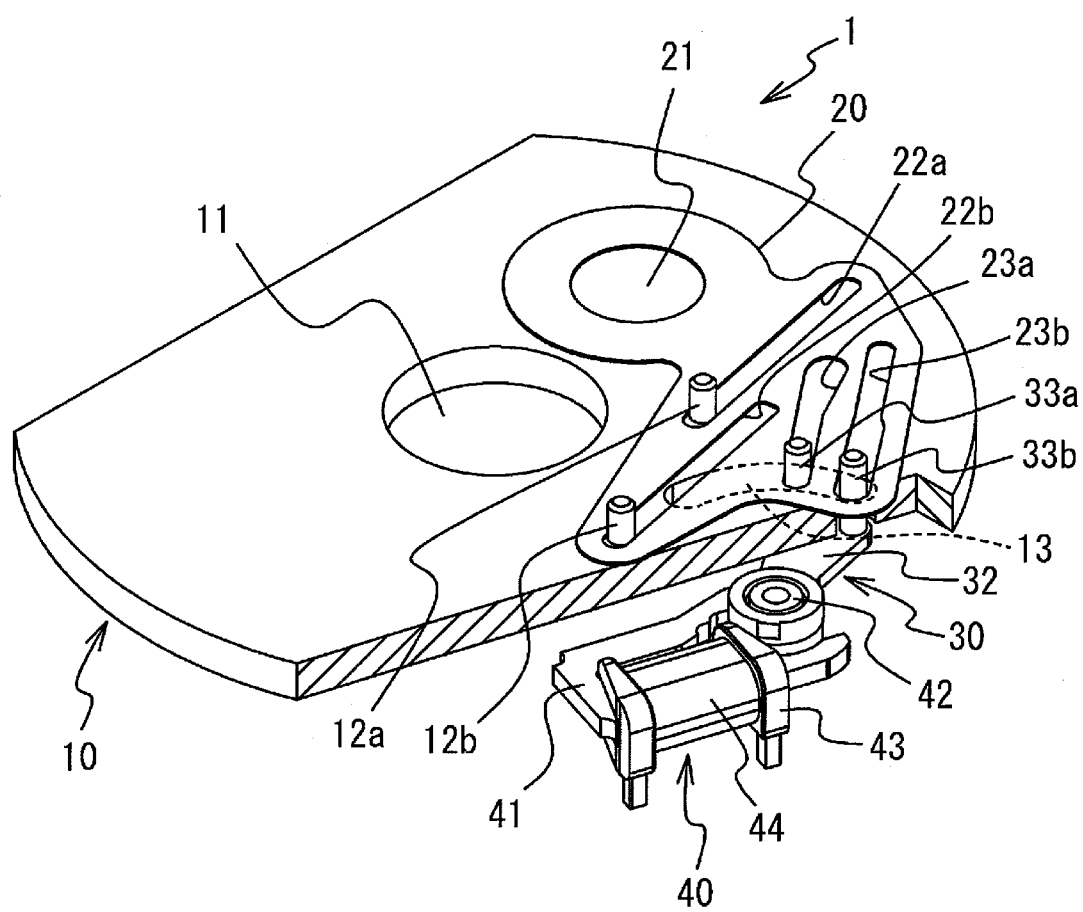
FIG. 2 is a perspective view of the sector blade driving apparatus in which a board is partially omitted.

FIG. 2 is a perspective view of the sector blade driving apparatus 1 according to the first embodiment in which a board 10 is partially omitted. The sector blade driving apparatus 1 includes: the board 10 provided with an opening 11 at its center portion; a blade 20 adjusting the opening amount of the opening 11 and supported for linear movement; a drive member 30 rotatably supported and driving the blade 20; and an electromagnetic actuator 40 driving the drive member 30. The blade 20 and the electromagnetic actuator 40 are arranged to sandwich the board 10.

The electromagnetic actuator 40 includes: a stator 41 having a letter U shape and magnetic pole portions at its both ends, respectively; a rotor 42 having a cylindrical shape and two different poles magnetized in its circumferential direction; a coil bobbin 43 attached to an arm portion of the stator 41; a coil 44 wound around the coil bobbin 43. The magnetic pole potions mentioned above are excited to have different polarities by energizing the coil 44, and then an attractive force and a repulsive force are generated between the rotor 42 and the magnetic pole portions to rotate the rotor 42.

The drive member 30 is fixed to the rotor 42 and rotates within a given angular range in conjunction with the rotor 42. The drive member 30 is made of resin. Also, the drive member 30 includes: an arm 32 extending radially and outwardly from the rotation center of the drive member 30, that is, the rotation center of the rotor 42; drive pins 33a and 33b provided to stand from an end portion of the arm 32. The arm 32 transmits the drive force of the drive member 30 to the blade 20 engaging the drive pins 33a and 33b. Further, the arm 32 is widened as being away from the rotation center of the drive member 30.

Figure 3:
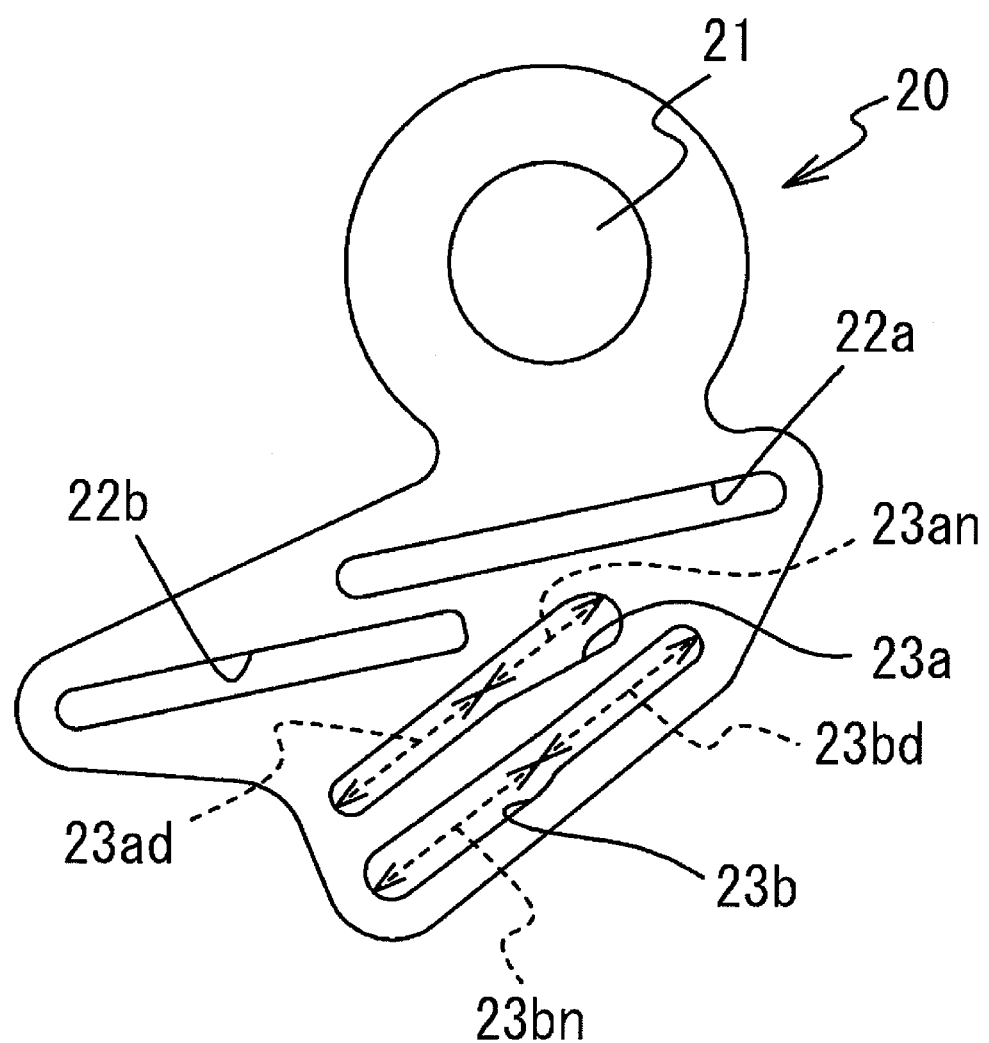
FIG. 3 is front view of a blade.

The board 10 is made of resin and is provided with a single relieving hole 13 for relieving both of the drive pins 33a and 33b. Additionally, the blade 20 is made of a general anti-glare film or a light shielding film, for example, a somablack film (made by SOMAR corporation). The blade 20 is provided with engagement holes 23a and 23b respectively engaging the drive pins 33a and 33b. The engagement holes 23a and 23b each has a substantially linear shape and extend along each other. FIG. 3 is a front view of the blade 20. The blade 20 has an aperture opening 21 with a diameter smaller than that of the opening 11.

Further, the board 10 is provided with guide pins 12a and 12b, and the blade 20 is provided with guide holes 22a and 22b respectively engaging the guide pins 12a and 12b. The guide holes 22a and 22b each has a liner shape and are parallel to each other. In addition, the guide holes 22a and 22b are not parallel to the engagement holes 23a and 23b.

Referring now to FIG. 3, the engagement hole 23a includes a drive area 23ad and a non-drive area 23an, and the engagement hole 23b also includes a drive area 23bd and a non-drive area 23bn. When the drive pin 33a is positioned in the drive area 23ad, the driver force of the drive pin 33a is transmitted to the blade 20. When the drive pin 33a is positioned in the non-drive area 23an, the drive force of the drive pin 33a is relieved. Similarly, when the drive pin 33b is positioned in the drive area 23bd, the drive force of the drive pin 33b is transmitted to the blade 20. When the drive pin 33b is positioned in the non-drive area 23bn, the drive force of the drive pin 33b is relieved. Further, in the engagement hole 23a, the drive area 23ad is continuous with the non-drive area 23an, in this order, in a direction from lower left to upper right of the surface of FIG. 3. In contrast, in the engagement hole 23b, the non-drive area 23bn is continuous with the drive area 23bd, in this order, in a direction from lower left to upper right of the surface of FIG. 3. The non-drive area 23an is wider than the drive area 23ad. Similarly, the non-drive area 23bn is wider than the drive area 23bd. This will be described below.

Figure 4:
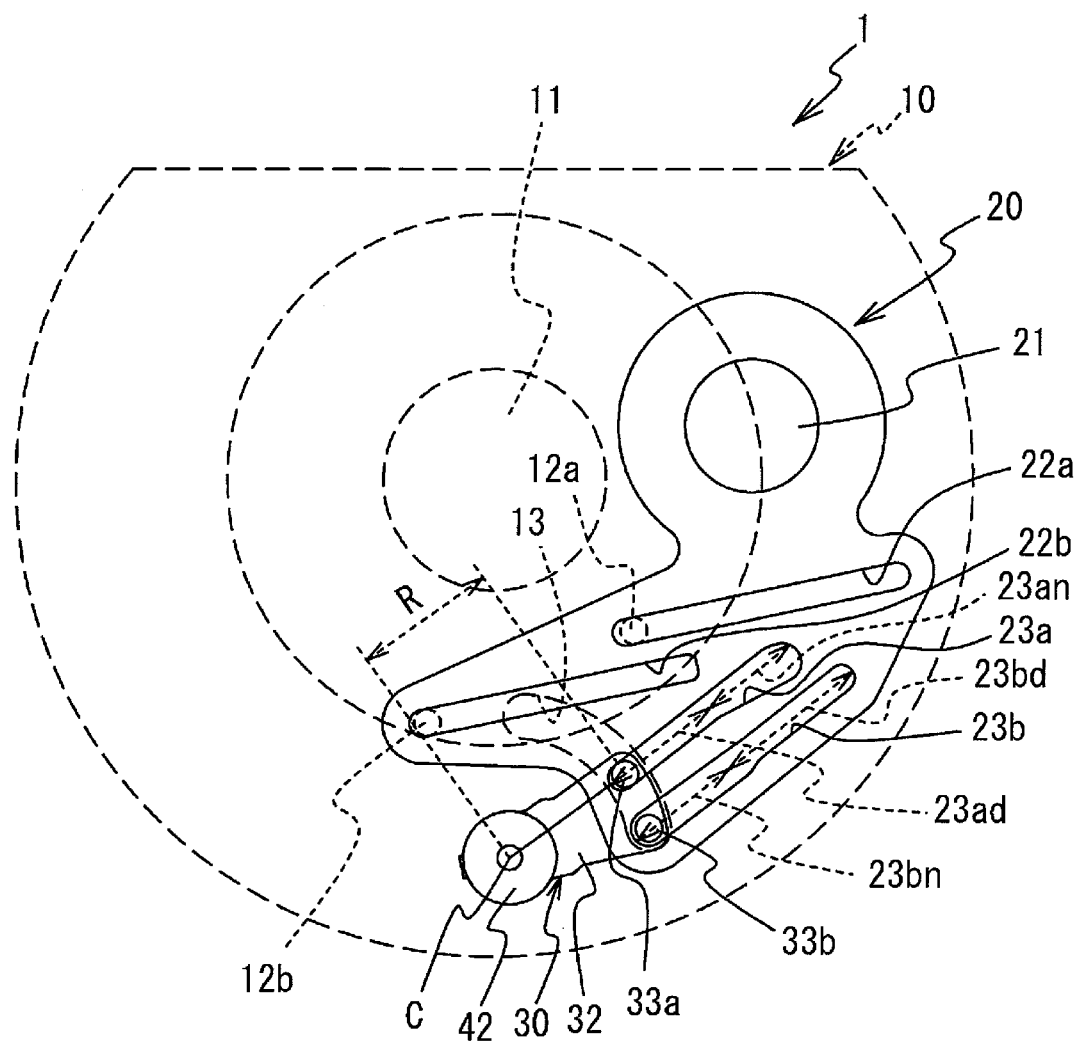
FIG. 4 is a front view of the sector blade driving apparatus in a fully opened state.
Figure 5:
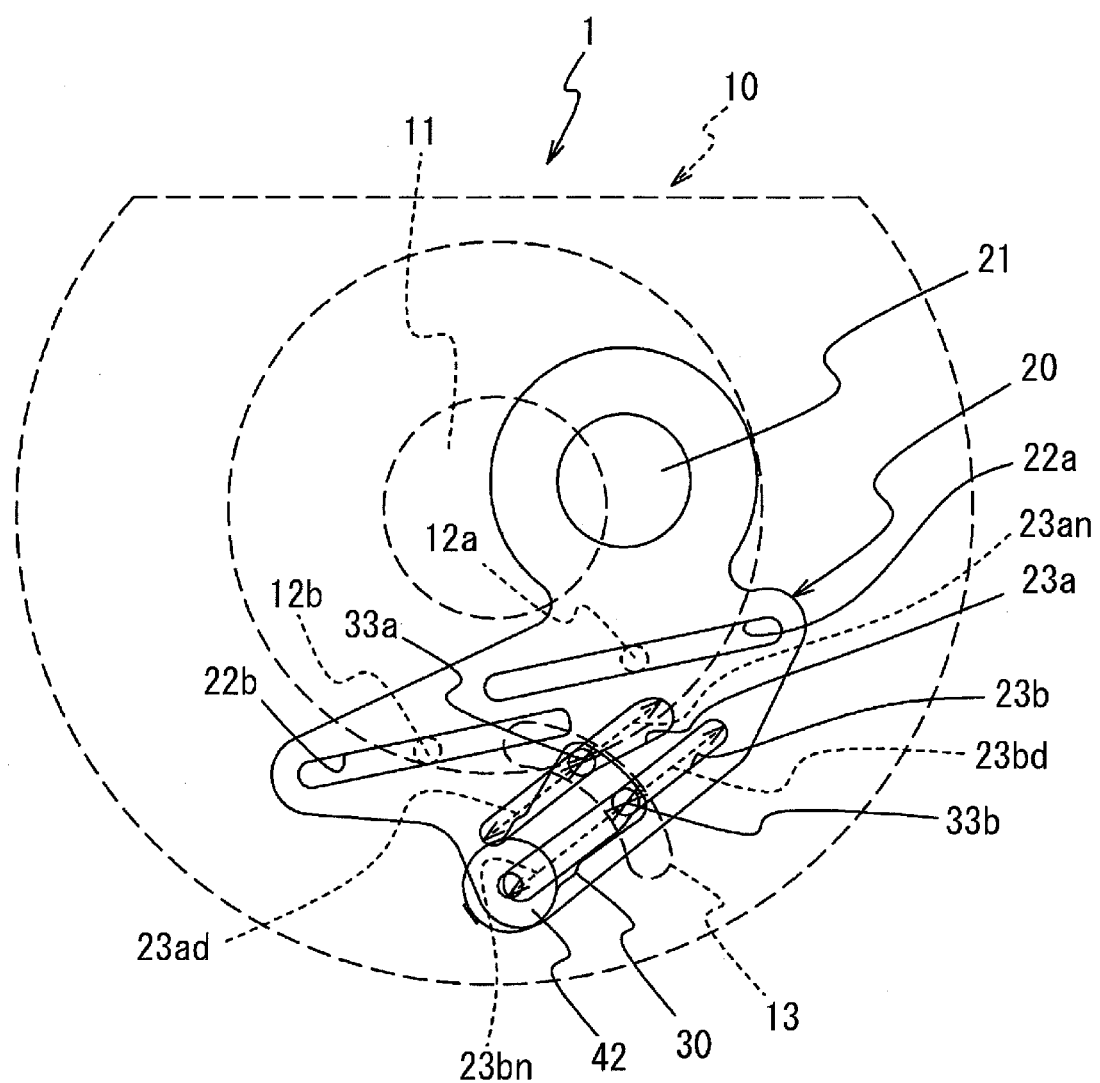
FIG. 5 is a front view of the sector blade driving apparatus in an intervened state while the fully opened state is being shifted from or to a small aperture state.
Figure 6:
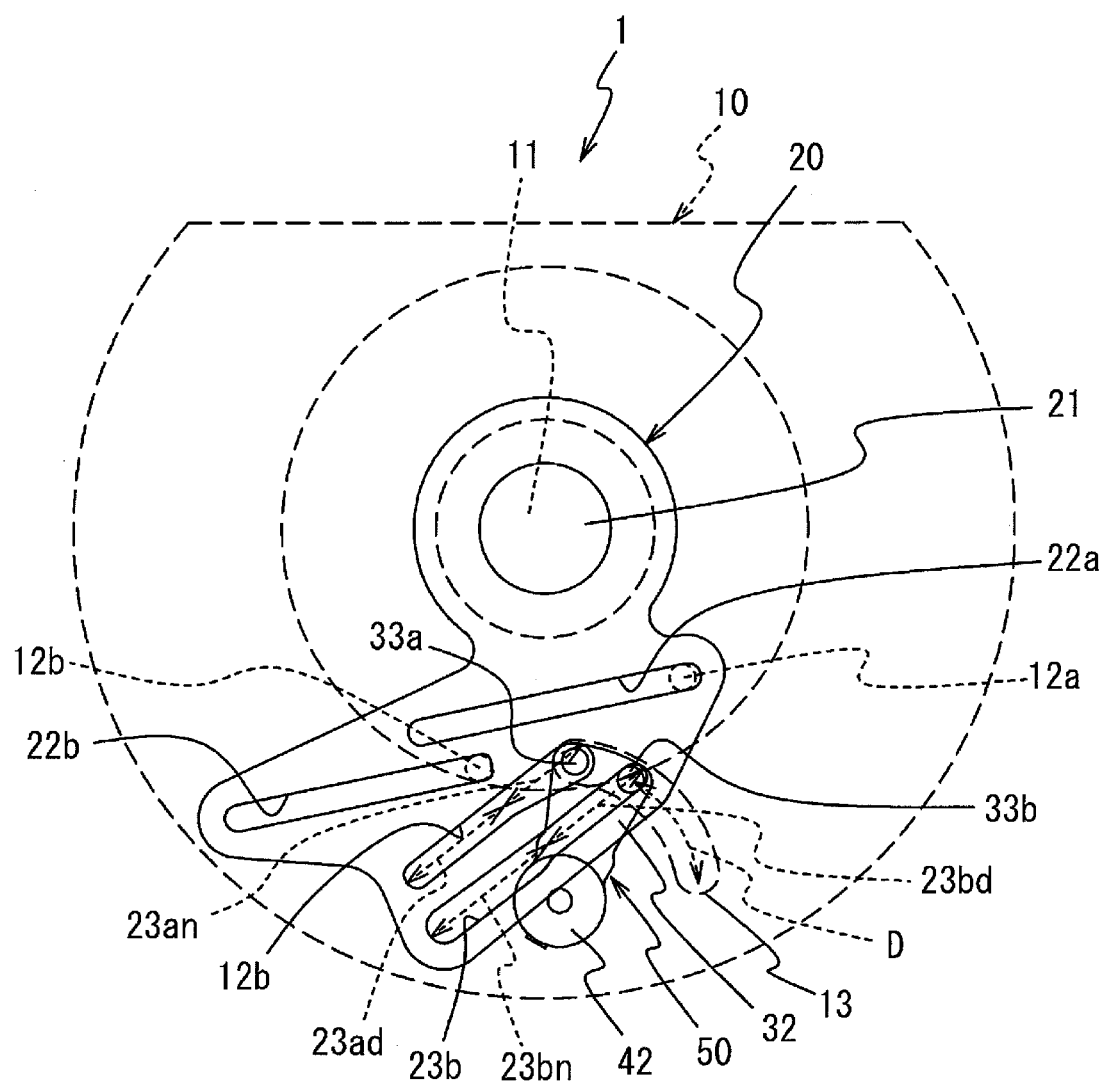
FIG. 6 is a front view of the sector blade driving apparatus in the small aperture state.

Next, a description will be given of an operation of the sector blade driving apparatus 1. FIG. 4 is a front view of the sector blade driving apparatus 1 in a fully opened state. FIG. 5 is a front view of the sector blade driving apparatus 1 in an intervened state while the fully opened state is being shifted from or to a small aperture state. FIG. 6 is a front view of the sector blade driving apparatus 1 in the small aperture state. In addition, in FIGS. 4 to 6, the board 10 is illustrated by broken lines, and the rotor 42 of the electromagnetic actuator 40 and the drive member 30 are illustrated by solid lines, in order to facilitate the understanding of the operation of the sector blade driving apparatus 1.

As illustrated in FIG. 4, in the fully opened state, the blade 20 is positioned to be receded from the opening 11. Moreover, in this state, the drive pin 33b is in contact with one end of the relieving hole 13 to restrict the drive member 30 from swinging clockwise. Further, the guide pins 12a and 12b are in contact with the one ends of the guide holes 22a and 22b, respectively, to restrict the blade 20 from moving away from the opening 11.

In addition, the drive pins 33a and 33b are provided in the arm 32 so as to be aligned in the circumferential direction as centering the rotation center C of the drive member 30 (the rotation center of the rotor 42). Specifically, the drive pins 33a and 33b are apart from the rotation center C of the drive member 30 by a distance R. Further, the drive pins 33a and 33b are apart from each other in the circumferential direction by a given distance. That is, the drive pins 33a and 33b are arranged such that a line connecting them intersects radial lines extending from the rotation center C of the arm 32.

The rotor 42 rotates counterclockwise from the state illustrated in FIG. 4, and then the drive member 30 also rotates counterclockwise. The rotation of the drive member 30 allows the drive pins 33a and 33b to move counterclockwise within the relieving hole 13. During this movement, the drive pin 33a slidably contacts an inner surface of the engagement hole 23a in the drive area 23ad to transmit the drive force of the drive pin 33a to the blade 20. In contrast, the drive pin 33b does not slidably contact an inner surface of the engagement hole 23b in the non-drive area 23bn to relive the movement of the drive pin 33b. In this way, the drive force of the electromagnetic actuator 40 is transmitted to the blade 20 via the drive pin 33a.

When the rotor 42 rotates counterclockwise as mentioned above, the blade 20 moves along the guide holes 22a and 22b in a lower left direction. That is, the blade 20 relatively moves in the lower left direction such that the drive pins 33a and 33b rise in the engagement holes 23a and 23b, respectively. In this way, the state is shifted to the state illustrated in FIG. 5.

In the state illustrated in FIG. 5, the drive pin 33a is positioned in the vicinity of the boundary between the drive area 23ad and the non-drive area 23an, and the drive pin 33b is also positioned in the vicinity of the boundary between the drive area 23bd and the non-drive area 23bn. In this state, the drive pins 33a and 33b partially contact the inner surfaces of the engagement holes 23a and 23b, respectively. When the rotor 42 further rotates counterclockwise from this state, the drive pin 33a escapes from the drive area 23ad and then moves into the non-drive area 23an. Also, the drive pin 33b escapes from the non-drive area 23bn and then moves into the drive area 23bd. Therefore, the drive force of the drive pin 33a is relived by the non-drive area 23an, whereas the drive force of the drive pin 33b is transmitted to the blade 20 by abutting the drive pin 33b with the inner surface of the drive area 23bd. In this way, when the rotor 42 further rotates counterclockwise from the state illustrated in FIG. 5, the drive force of the electromagnetic actuator 40 is transmitted to the blade 20 via the drive pin 33b.

In the state illustrated in FIG. 6, the drive pin 33a is in contact with the other end of the relieving hole 13 to restrict the drive member 30 from rotating counterclockwise. In this situation, the guide pins 12a and 12b contact the other ends of the guide holes 22a and 22b, respectively, to restrict the blade 20 from further moving in the lower left direction. In this state, the opening 11 overlaps the aperture opening 21. Additionally, when the rotor 42 rotates again clockwise from the state illustrated in FIG. 6, the state is shifted to the state illustrated in FIG. 5 or 4.

In this way, in the state shifting between the fully opened state and the small aperture state, the roll for transmitting the drive force of the electromagnetic actuator 40 to the blade 20 is shifted from one of the drive pins 33a and 33b to the other thereof. That is, the engagement holes 23a and 23b are designed such that any one of the drive forces of the drive pins 33a and 33b is transmitted to the blade 20 in the process for moving the blade 20. This is because the two drive pins 33a and 33b are provided at the end portion of the arm 32.

For example, if the engagement holes 23a and 23b are substantially parallel to each other and the drive pins 33a and 33b slidably abut any portions of the engagement holes 23a and 23b constantly within all ranges, respectively, sliding friction may be partially increased and the drive member 30 may not smoothly rotate. Specifically, this is because the distance between the drive pins 33a and 33b is constant whereas a distance between the drive pins 33a and 33b is changeable in the direction perpendicular to such a direction to extend the engagement holes 23a and 23b. For example, if the drive pins 33a and 33b slidably abut any portions of the engagement holes 23a and 23b constantly within all ranges in the state illustrated in FIG. 5, the distance between the engagement holes 23a and 23b is longer than the distance between the drive pins 33a and 33b in the states illustrated in FIGS. 4 and 6. This may increase the sliding friction generated between the drive pin 33a and the engagement hole 23a, or between the drive pin 33b and the engagement hole 23b.

Moreover, a following description will be given of a reason for providing the two drive pins 33a and 33b in the arm 32.

Figure 7:
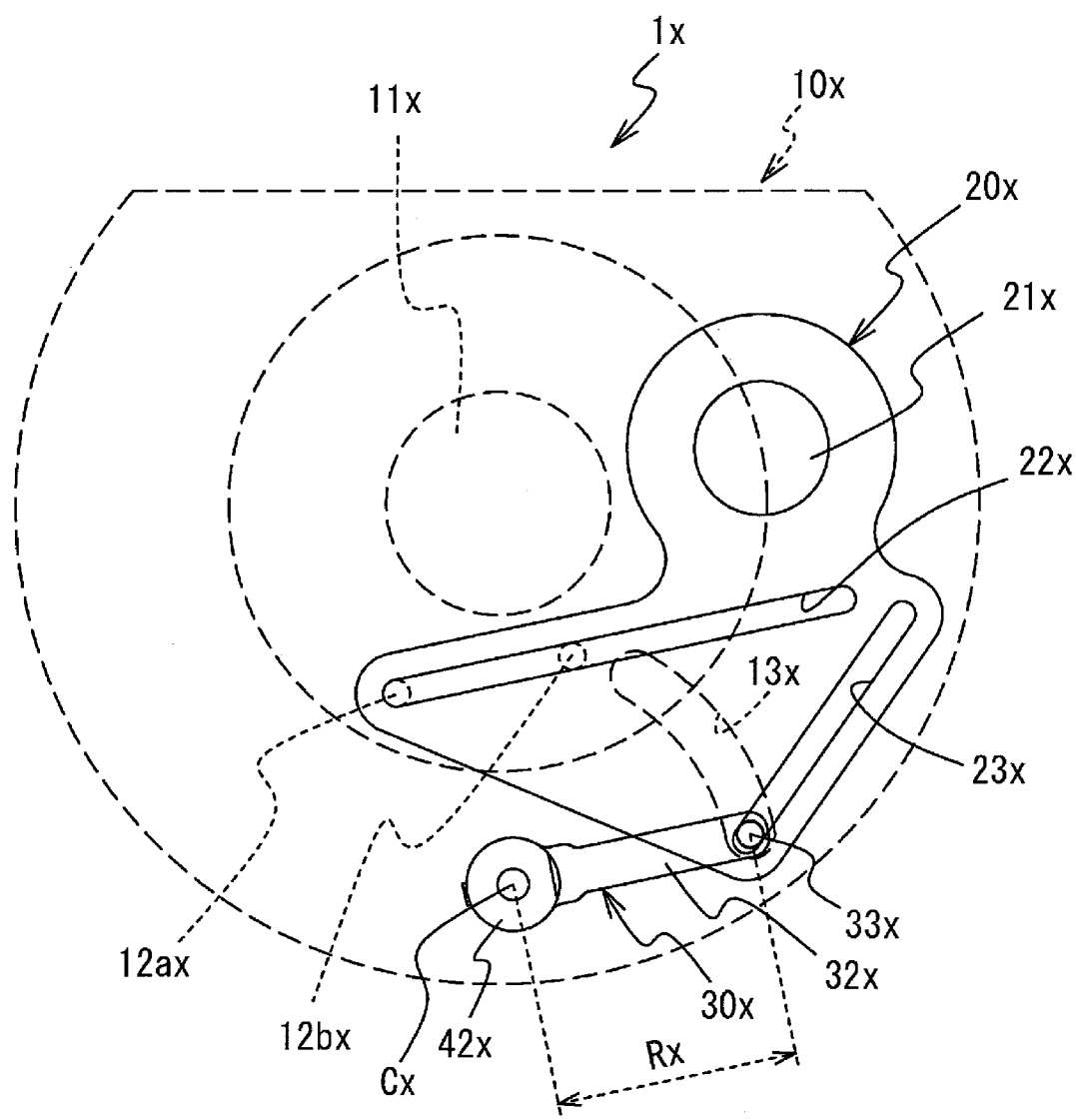
FIG. 7 is a front view of a conventional sector blade driving apparatus in a fully opened state.
Figure 8:
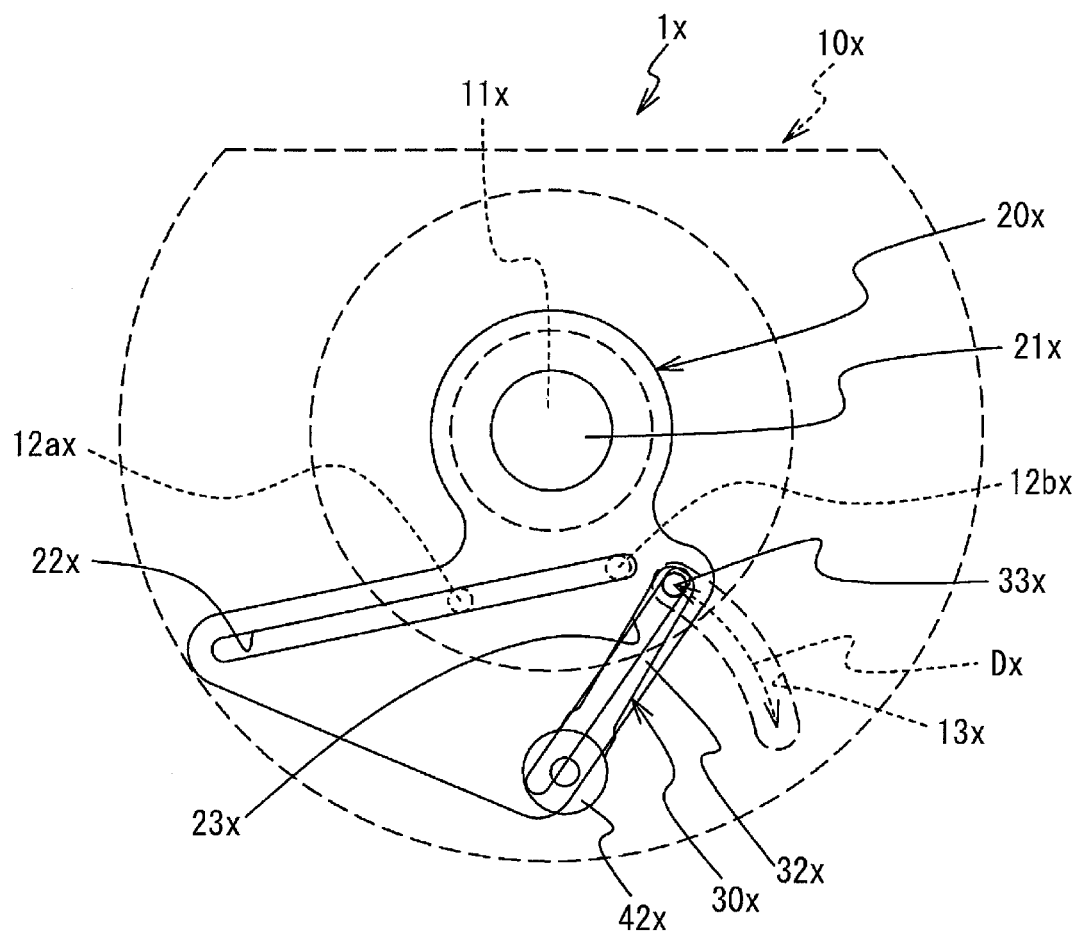
FIG. 8 is a front view of the conventional sector blade driving apparatus in a small aperture state.

Next, a conventional sector blade driving apparatus 1x will be described. FIG. 7 is a front view of the sector blade driving apparatus 1x in the fully opened state. FIG. 8 is a front view of the sector blade driving apparatus 1x in the small aperture state. Additionally, the board 10x is indicated by broken lines and the other portions are partially omitted, in order to facilitate the understanding.

The sector blade driving apparatus 1x has a blade 20x. The moving distance of the blade 20x is substantially identical to that of the blade 20. The drive member 30x includes an arm 32x and a drive pin 33x. Further, the single drive pin 33x is provided to stand at an end of the arm 32x. Furthermore, the board 10x is provided with a relieving hole 13x relieving the drive pin 33x, and the blade 20x is provided with the single engagement hole 23x engaging the drive pin 33x. The engagement hole 23x is formed into a linear shape. Additionally, the drive pin 33x slidably contacts any portion of the engagement hole 23x within all the range at any time. That is, the engagement hole 23x is configured such that the drive force of the drive pin 33x can be constantly transmitted to the blade 20x. Additionally, the blade 20x has a single guide hole 22x, with a linear shape, engaging guide pins 12ax and 12bx provided in the board 10x. Like the sector blade driving apparatus 1 according to the embodiment, in the sector blade driving apparatus 1x, the fully opened state illustrated in FIG. 7 is shifted to the small aperture state illustrated in FIG. 8, by rotating the drive member 30x counterclockwise.

Referring to FIGS. 4 and 7, the distance Rx to the drive pin 33x from the rotation center Cx of the drive member 30x is longer than the distance R to the drive pins 33a and 33b from the rotation center C of the drive member 30 of the sector blade driving apparatus 1. This is because it is necessary to ensure the moving distance of the drive pin in order to ensure the moving distance of the linearly moving blade and it is preferable to lengthen the distance from the rotation center of the arm to the drive pin. Providing that the rotational range of the drive member is constant, the moving distance of the drive pin is greater as the distance from the rotation center of the arm to the drive pin is longer. However, when the distance Rx from the rotation center Cx of the drive member 30x to the drive pin 33x is longer as illustrated in FIG. 7, a large space has to be ensured, within the sector blade driving apparatus 1, for permitting the rotation of the drive member 30x. This increases the size of the sector blade driving apparatus 1x.

However, if the length of the arm is shortened, the size of the sector blade driving apparatus to be reduced. In response thereto, the moving distance of the drive pin is also reduced. Accordingly, the moving distance of the blade is not ensured. As a solution for this, the moving distance of the drive pin may be ensured by increasing the rotational range of the rotor. However, to enlarge the rotational range of the rotor, there are drawbacks in the accurate position settings of the magnetic poles, formed in the stator, facing the rotor, and the assurance of the torque. Thus, the moving distance of the drive pin is needed to be ensured without increasing the rotational range of the rotor.

Therefore, in the sector blade driving apparatus 1 according to the present embodiment as mentioned above, by providing two drive pins 33a and 33b in the arm 32, the moving distance of the blade 20 can be ensured without increasing the rotational range of the rotor 42.

This will be described in more detail. The length of the relieving hole 13 is substantially identical to that of the relieving hole 13x, as illustrated in FIGS. 6 and 8. However, the moving distance D of the drive pin 33b is shorter than the moving distance Dx of the drive pin 33x. This is because, the drive pin 33b abuts one end of the relieving hole 13 in the fully opened state and the drive pin 33a abuts the other end of the relieving hole 13, whereas, in the sector blade driving apparatus 1x, the single drive pin 33x abuts one or the other end of the relieving hole 13x in the fully opened state or the small aperture state. That is, in the sector blade driving apparatus 1 according to the present embodiment, the rotational range of the drive member 30 can be reduced by the distance between the drive pins 33a and 33b. This ensures the moving distance of the blade 20 without increasing the rotational range of the rotor 42, and also reduces the size of the sector blade driving apparatus 1. Further, by providing the simple structure in which two drive pins 33a and 33b are provided in the end portion of the arm 32, the moving distance of the blade 20 can be ensured with the small size being maintained.

Second Embodiment

Figure 9:
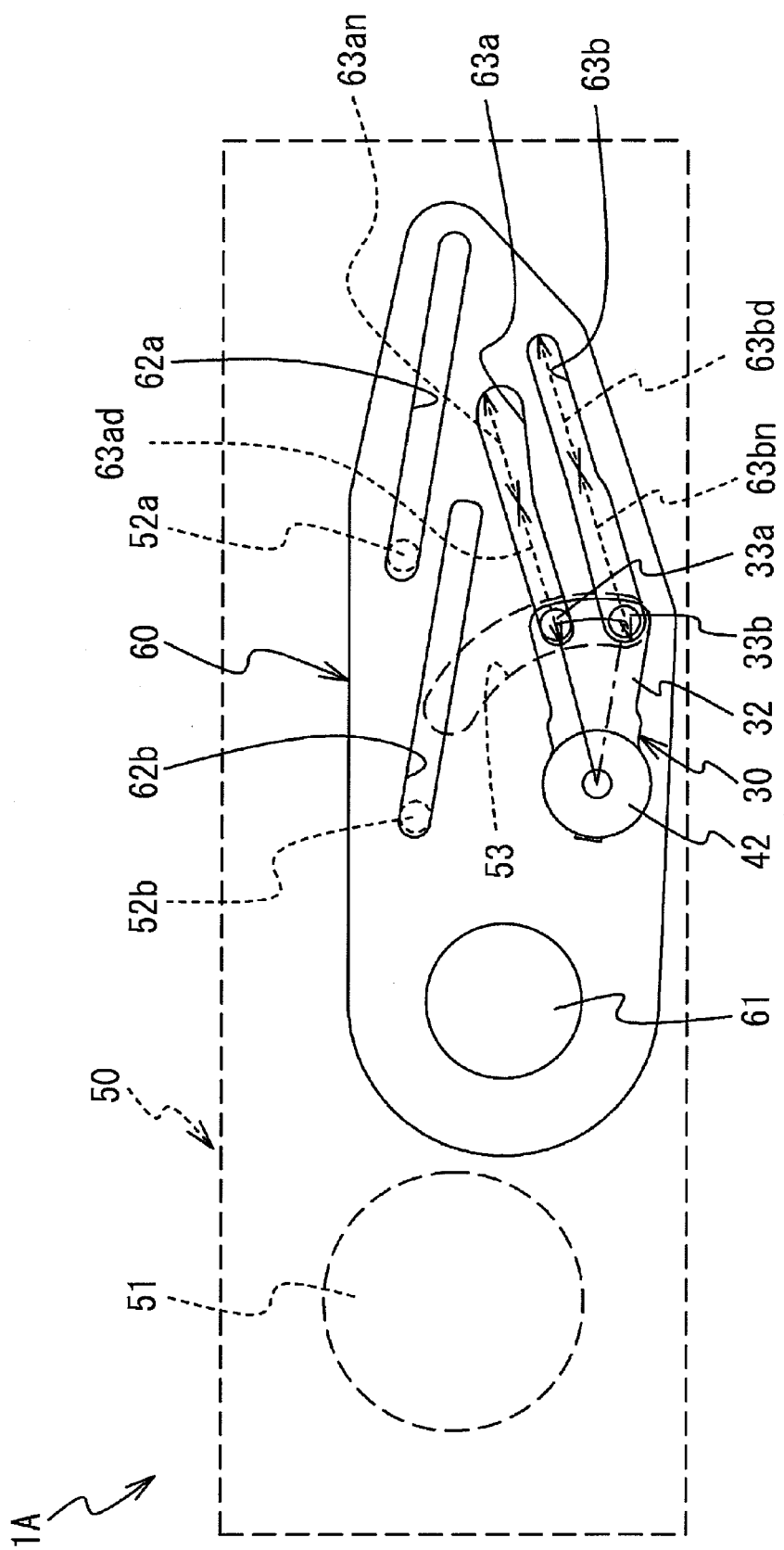
FIG. 9 is a front view of a sector blade driving apparatus according to a second embodiment in a fully opened state.
Figure 10:
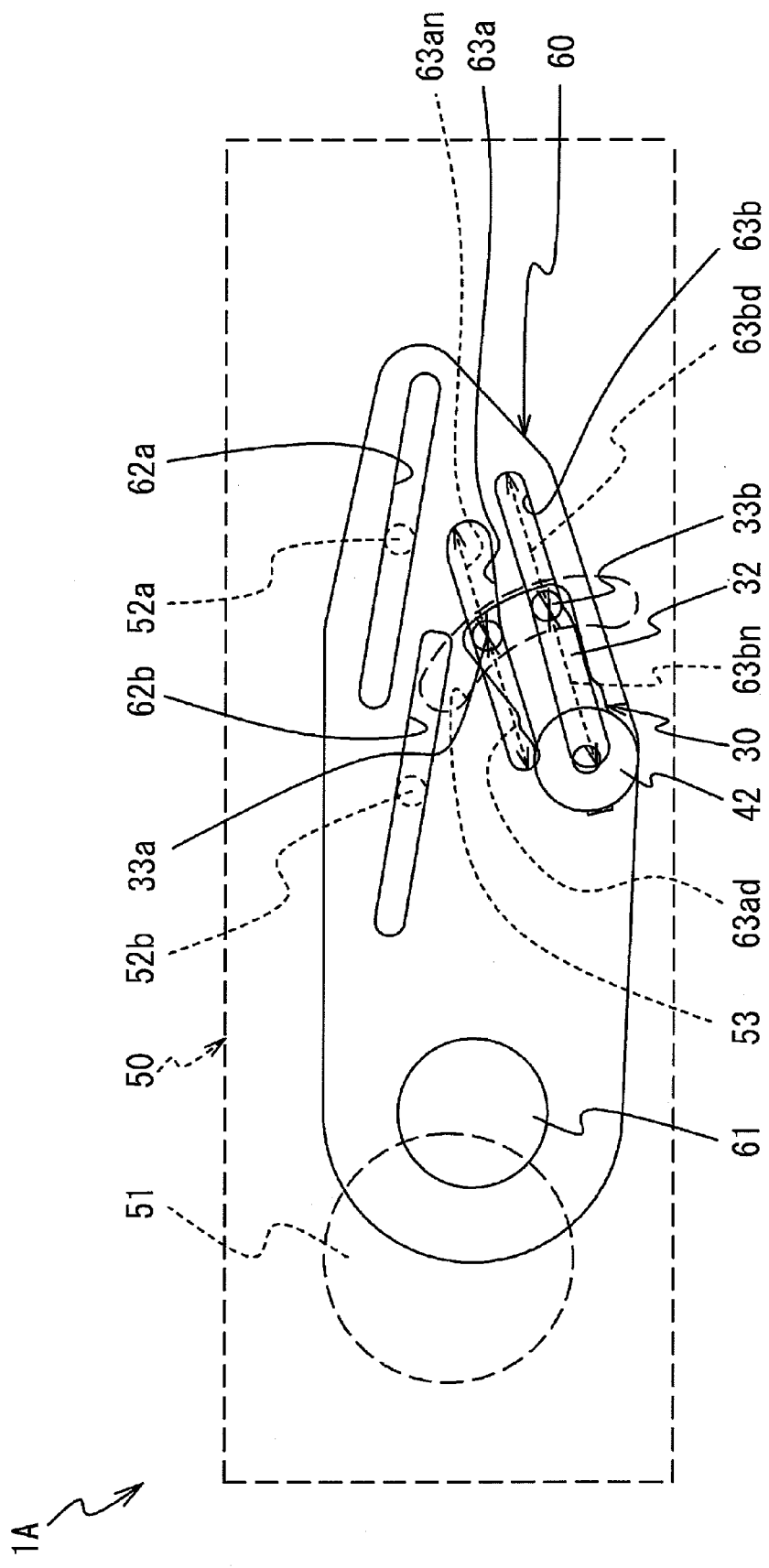
FIG. 10 is a front view of the sector blade driving apparatus according to the second embodiment in an intervened state where the fully opened state is shifted from or to a small aperture state.
Figure 11:
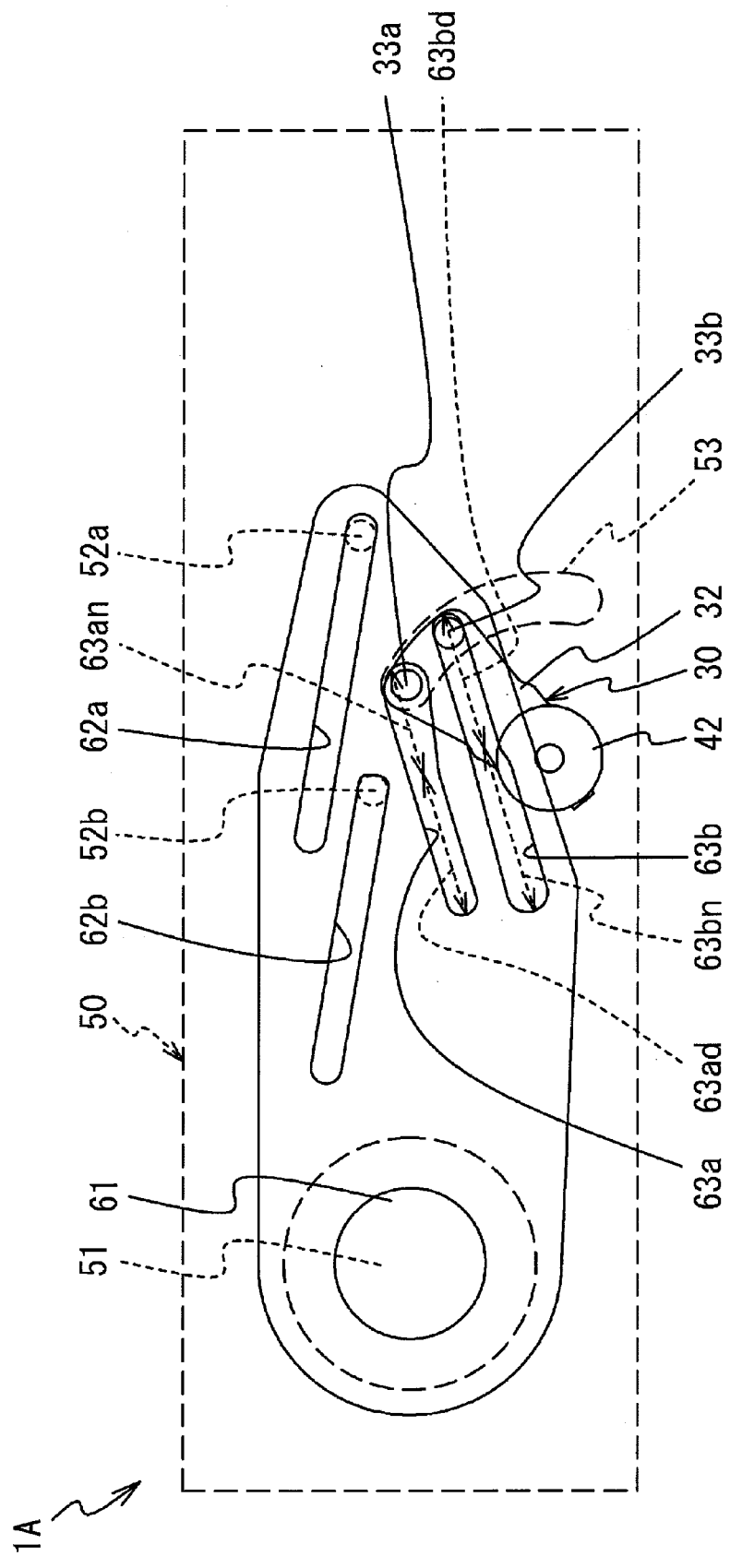
FIG. 11 is a front view of the sector blade driving apparatus according to the second embodiment in the small aperture state.

Next, a description will be given of a sector blade driving apparatus 1A according to the second embodiment. FIGS. 9 to 11 are explanatory views of the sector blade driving apparatus 1A according to the second embodiment. FIG. 9 is a front view of the sector blade driving apparatus 1A according to the second embodiment in a fully opened state. FIG. 10 is a front view of the sector blade driving apparatus 1A according to the second embodiment in an intervened state where the fully opened state is shifted from or to a small aperture state. FIG. 11 is a front view of the sector blade driving apparatus 1A according to the second embodiment in the small aperture state. In FIGS. 9 to 11, a board 50 is illustrated by broken lines and other portions are partially omitted, in order to facilitate the understanding of the operation of the sector blade driving apparatus 1A. The sector blade driving apparatus 1A is a so-called guillotine shutter.

Referring now to FIGS. 9 to 11, the sector blade driving apparatus 1A includes the board 50 and a blade 60. The board 50 has a rectangular shape. Further, the board 50 has an opening 51. The blade 60 has an aperture opening 61. The board 50 is provided with guide pins 52a and 52b which engage guide holes 62a and 62b which are formed in the blade 60, respectively. Additionally, the guide holes 62a and 62b are substantially parallel to each other. The guide holes 62a and 62b respectively engage the guide pins 52a and 52b, thereby supporting the blade 60 for the movement in the longitudinal direction of the board 50. Also, the board 50 has a single reliving hole 53 for reliving the movements of the drive pins 33a and 33b.

The blade 60 has engagement holes 63a and 63b respectively engaging the drive pins 33a and 33b. Like the sector blade driving apparatus 1 according to the first embodiment, the engagement holes 63a and 63b includes a drive area 63ad and a non-drive area 63an and a drive area 63bd and a non-drive area 63bn, respectively.

In addition, the sector blade driving apparatus 1A employs an electromagnetic actuator as a drive source, like the sector blade driving apparatus 1 according to the first embodiment. Also, only the rotor 42 of the electromagnetic actuator is illustrated in FIGS. 9 to 11.

In the fully opened state, the drive pin 33a is positioned in the drive area 63ad, and the drive pin 33b is positioned in the non-drive area 63bn. When the rotor 42 rotates counterclockwise from this state, the blade 60 moves along the guide holes 62a and 62b in the left direction, so that the state is shifted to the state illustrated in FIG. 10. When the rotor 42 further rotates counterclockwise, the drive pin 33*a* escapes from the drive area 63*ad* and moves into the non-drive area 63*an*, and the drive pin 33*b* escapes from the non-drive area 63*bn* and moves into the drive area 63*bd*, so that the state is shifted to the state illustrated in FIG. 11. In this manner, the present invention can be adapted to the so-called guillotine shutter.

The present invention is not limited to the above-mentioned embodiment, and other embodiments, variations and modifications may be made without departing from the scope of the present invention.

The present invention may employ a blade for defining an opening formed on the board into the fully closed state. The blade may has an ND (Neutral Density) filter attached to its small aperture opening.

Although the above embodiment exemplifies the blade 20 made of the general anti-glare film or the light shielding film, the blade 20 may be made of resin.

Finally, several aspects of the present invention are summarized as follows.

According to an aspect of the present invention, there is provided a sector blade driving apparatus including: a board having an opening; a blade supported for linear movement, adjusting an opening amount of the opening, and having first and second engagement holes; a drive member rotating to drive the blade; and an arm transmitting an drive force of the drive member to the blade, and provided in the drive member, wherein the arm is provided with first and second drive pins respectively engaging the first and second engagement holes.

With such a configuration, since the arm is provided with the first and second drive pins, even when the arm is made short, the moving distance of the blade can be ensured without changing the rotational range of the arm. Accordingly, the moving distance of the blade can be ensured by the simple structure with its small size being maintained.

In the above configuration, the first and second drive pins may be aligned in a circumferential direction as centering a rotation center about which the arm rotates. This ensures the moving distance of the blade without changing the rotational range of the arm.

In the above configuration, the first and second engagement holes may extend along each other. This ensures the moving distance of the blade with the small size being maintained, since the first and second drive pins can be arranged in a minimum space.

In the above configuration, the first engagement hole may include a drive area transmitting a drive force of the first drive pin and a non-drive area relieving the drive force of the first drive pin, the second engagement hole may include a drive area transmitting a drive force of the second drive pin and a non-drive area relieving the drive force of the second drive pin, and when one of the first and second drive pins is positioned in the drive area, the other of the first and second drive pins may be positioned in the non-drive area.

With such a configuration, the arm portion is provided with the plural drive pins respectively engaging the engagement holes, thereby ensuring the moving distance of the pin, even when the arm is short.

In the above configuration, the drive member and the blade may be arranged to sandwich the board, and the board may have a single relieving hole relieving the first and second drive pins. The provision of the single reliving hole increases the design flexibility of a hole, for attaching the actuator, or the like. Consequently, a space on the board can be effectively used, and the moving distance of the blade can be ensured with the small size being maintained.

What is claimed is:

1. A sector blade driving apparatus comprising:
   a board having an opening;
   a blade supported for linear movement, adjusting an opening amount of the opening, and having first and second engagement holes;
   a drive member rotating to drive the blade; and
   an arm transmitting an drive force of the drive member to the blade, and provided in the drive member,
   wherein the arm is provided with first and second drive pins respectively engaging the first and second engagement holes.

2. The sector blade driving apparatus of claim 1, wherein the first and second drive pins are aligned in a circumferential direction as centering a rotation center about which the arm rotates.

3. The sector blade driving apparatus of claim 1, wherein the first and second engagement holes extend along each other.

4. The sector blade driving apparatus of claim 1, wherein:
   the first engagement hole includes a drive area transmitting a drive force of the first drive pin and a non-drive area relieving the drive force of the first drive pin;
   the second engagement hole includes a drive area transmitting a drive force of the second drive pin and a non-drive area relieving the drive force of the second drive pin; and
   when one of the first and second drive pins is positioned in the drive area, the other of the first and second drive pins is positioned in the non-drive area.

5. The sector blade driving apparatus of claim 1, wherein:
   the drive member and the blade are arranged to sandwich the board; and
   the board has a single relieving hole relieving the first and second drive pins.

* * * * *